United States Patent
Heckmann et al.

(10) Patent No.: US 10,789,836 B2
(45) Date of Patent: Sep. 29, 2020

(54) DRIVING ASSISTANCE METHOD AND DRIVING ASSISTANCE SYSTEM WITH IMPROVED RESPONSE QUALITY FOR DRIVER ATTENTION DELEGATION

(71) Applicant: HONDA RESEARCH INSTITUTE EUROPE GMBH, Offenbach/Main (DE)

(72) Inventors: Martin Heckmann, Offenbach (DE); Heiko Wersing, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 106 days.

(21) Appl. No.: 15/491,333

(22) Filed: Apr. 19, 2017

(65) Prior Publication Data

US 2017/0309173 A1    Oct. 26, 2017

(30) Foreign Application Priority Data

Apr. 20, 2016 (EP) ..................................... 16166193
Jun. 13, 2016 (EP) ..................................... 16174087

(51) Int. Cl.
*G01C 21/34* (2006.01)
*G08G 1/01* (2006.01)
(Continued)

(52) U.S. Cl.
CPC ....... *G08G 1/0141* (2013.01); *B60W 50/0098* (2013.01); *B60W 50/085* (2013.01);
(Continued)

(58) Field of Classification Search
CPC .......................... G08G 1/0141; B60W 50/0098
See application file for complete search history.

(56) References Cited

U.S. PATENT DOCUMENTS

| 2002/0036584 A1* | 3/2002 | Jocoy | ............ G01S 13/931 342/70 |
| 2006/0004486 A1 | 1/2006 | Yoshikawa et al. | |

(Continued)

FOREIGN PATENT DOCUMENTS

| DE | 43 13 568 C1 | 6/1994 |
| DE | 102012201934 A1 | 8/2013 |

(Continued)

OTHER PUBLICATIONS

European Search Report dated Feb. 3, 2017 corresponding to European Patent Application No. 16174087.3.

*Primary Examiner* — Jess Whittington
(74) *Attorney, Agent, or Firm* — Squire Patton Boggs (US) LLP

(57) ABSTRACT

The invention relates to a system and method for assisting a driver in driving a vehicle. First information on an environment of the vehicle is obtained and an instruction from the vehicle driver is received. An evaluation task defining an aspect of a current traffic situation encountered by the vehicle and to be evaluated is defined from the received instruction. An evaluation of the obtained information according to the evaluation task is performed, and an evaluation result is generated. Other aspects of the traffic situation and their relation to the aspect defined in the task are then evaluated additionally. Finally an information on the basis of the evaluation result and the other determined aspects is generated and output.

9 Claims, 2 Drawing Sheets

(51) Int. Cl.
  *B60W 50/14* (2020.01)
  *B60W 50/00* (2006.01)
  *B60W 50/08* (2020.01)
  *G08G 1/16* (2006.01)
  *B60W 30/18* (2012.01)
  *B60W 30/095* (2012.01)

(52) U.S. Cl.
  CPC ............. *B60W 50/14* (2013.01); *G08G 1/012* (2013.01); *G08G 1/0112* (2013.01); *G08G 1/0133* (2013.01); *G08G 1/167* (2013.01); *B60K 2370/148* (2019.05); *B60W 30/095* (2013.01); *B60W 30/18154* (2013.01); *B60W 2050/009* (2013.01); *B60W 2050/0075* (2013.01); *B60W 2050/0089* (2013.01); *B60W 2540/043* (2020.02); *B60W 2540/21* (2020.02)

(56) References Cited

U.S. PATENT DOCUMENTS

| | | | | |
|---|---|---|---|---|
| 2010/0033333 A1* | 2/2010 | Victor | ............... | A61B 5/1114 340/576 |
| 2010/0131148 A1* | 5/2010 | Camhi | ............... | B60W 40/09 701/31.4 |
| 2012/0283942 A1* | 11/2012 | T'Siobbel | ............... | G01C 21/26 701/410 |
| 2014/0095027 A1* | 4/2014 | Okuda | ............... | B60W 50/14 701/41 |
| 2014/0142867 A1* | 5/2014 | Shirakata | ............... | G01P 13/00 702/33 |
| 2014/0365228 A1* | 12/2014 | Ng-Thow-Hing | ..... | G06N 20/00 704/275 |
| 2015/0203108 A1 | 7/2015 | Loria et al. | | |
| 2015/0284008 A1* | 10/2015 | Tan | ............... | B60W 30/12 701/28 |
| 2016/0001781 A1* | 1/2016 | Fung | ............... | G16H 50/20 701/36 |
| 2017/0193384 A1* | 7/2017 | Mudalige | ............... | G08G 1/166 |

FOREIGN PATENT DOCUMENTS

| | | |
|---|---|---|
| EP | 1 958 840 A2 | 8/2008 |
| EP | 2 949 536 A1 | 12/2015 |
| KR | 20130076218 A | 7/2013 |

* cited by examiner

DRIVING ASSISTANCE METHOD AND DRIVING ASSISTANCE SYSTEM WITH IMPROVED RESPONSE QUALITY FOR DRIVER ATTENTION DELEGATION

BACKGROUND

Field

The invention relates to a method and a driver assistance system for assisting a driver in driving a vehicle and a vehicle having mounted such system thereon.

Description of the Related Art

During the last years driver assistance systems have been rapidly developed in order to increase the comfort for a driver and also the safety of driving. This is in particular important, because the traffic density increased over the years and thus, there are really complex traffic situations. In such situations it is advantageous if the driver is assisted by a driver assistance system so that responsibility for perceiving the traffic situation does not lie with the driver only.

Such driver assistance systems are capable of sensing the environment around a vehicle. In order to do so the vehicles are equipped with sensors like radar and/or lidar sensors and/or with image processing systems that include a camera. Such systems are capable of recognizing objects in the environment of the vehicle. In most cases the systems are mounted on the vehicle in a distributed fashion. Even a 360° surveillance around the vehicle could thus be realized. Of course, such a 360° surveillance exceeds any attention a human driver may pay.

Another source of information which can be used by driver assistance systems is a car-to-x communication so that a vehicle in the environment of the host vehicle of the system does not necessarily need to sense any objects in its environment on its own. Based on this information a driver assistance system performs an evaluation of the scene and based on a fixed scheme gives warnings or notifications to the driver. Since the driver assistance systems become more and more advanced vast information has to be presented to the driver in particular when a close cooperation between the driver and the system is necessary. This is for example the case when a semi-autonomous driving shall be made where driver and assistance system together solve challenges of the driving task.

In current systems the driver always has to be the last instance and information is provided for example by presenting an icon so that the driver easily can recognize the reason for the presented warning. Due to improved situation models, prediction models and evaluation of a sensed traffic scene in general the amount of information that is presented to the driver also increases. Thus, the presentation of the results of an analysis of the traffic situation may lead to an unwanted distraction of the driver because he is demanded to check what kind of notification or warning is presented, then to decide if this warning or notification is relevant for his intended further driving behavior and act accordingly. Thus, contrary to the original intention the driver may be disturbed by the driver assistance system and his concentration badly affected.

In order to reduce the negative effect for the driver modern systems use head-up displays which often use some form of augmented reality. Nevertheless, the presented objects may have been recognized by the driver already. Thus, the driver receives an additional warning or information which is unnecessary but obtrusive and redundant. This might lead to a low acceptance of such systems and finally the driver may deactivate the systems.

There have been presented some suggestions that use knowledge about a driver attention state which is obtained by monitoring overall awareness versus drowsiness levels of the driver. Alternatively, the viewing angle of the driver or an estimated distraction according to current entertainment usage or cell phone usage may be a basis for a threshold level which is used to determine whether a driver shall be notified or warned. Examples for such approaches can be found in KR 2011/0144720 or DE 10 2012109 297 A1. But in the disclosed systems it is not possible for the driver to instruct the system to focus the assistance of the system to particular aspects of the traffic scene flexibly.

Furthermore, it has been described that the driver himself can manually adapt the threshold meaning the risk level when a warning is output by a system. But as described in DE 10 2012 201 934 A1 this is a general setting for the system which does not take account of a current traffic situation of the host vehicle or actual assistance needs of the driver. Up to now there are mainly used general settings which are basically input by a user using a human machine interface of the car which basically consists of touch screens, buttons and control knobs. The settings are input in advance and cannot be adapted while encountering a sequence of traffic situations. Thus, the input of a general setting regarding risk level for example may either result in the driver feeling upset because of a lot of information which is too high is output or that in cases where assistance would be highly recommended a risk level that is set to a relatively high value will prevent that helpful information is output to the driver at all.

A first approach to improve the response of the system to the need of assistance of a driver of a vehicle was described in EP 2 949 536 A1. Here it is suggested to observe the environment of a vehicle permanently, but not to present all the information on traffic situations that can be analyzed from the observed environment to the driver. The information that is given to the driver is limited to such aspects that are mentioned by the driver and thus, are formulated in an instruction to the system. The instruction is given as a spoken instruction and from the spoken instruction, the system concludes what aspects of a traffic scene have to be evaluated. Only the respective information is then provided to the driver.

A similar suggestion was made in US 2006/0004486 that uses a human robot as a passenger in the vehicle. Such human robot has characteristics that try to resemble a human being. Thus, instructions that are provided by a driver of a car necessarily and systematically will result in a behavior of the robot being comparable to that of a human being, of course within the boundaries of the robot's capabilities. In the particular case of observing blind spots as described in that application, this means that upon receiving an instruction from the driver of a car, the robot will turn its head in order to observe only a section of the environment of the vehicle, in line with a given direction of the driver.

Both, US 2006/0004486 and EP 2 949 536 A1, encounter the same problem. The evaluation or even the observation is limited to a particular aspect of an entire traffic scene as defined by the driver of a vehicle. Of course this is in line with the intention of such a system to reduce the amount of information that is presented to a driver in order not to disturb concentration. But on the other side, this information that is provided to the driver has to be taken into account in an even wider context. In the situation of an intended turning maneuver of the ego-vehicle for example, the driver might instruct the system to observe a road coming from the right at an intersection. As a result and in response to this instruction, he will receive information about a gap between cars arriving at the intersection from the right. Then, the system might output the information "there is a gap right now" which might motivate the driver to immediately start his turning maneuver. But still there might be traffic and vehicles arriving from the left side that prohibit the turning maneuver if a collision shall be avoided. Since drivers in many cases tend to rely on information that is received from the system, this might even cause dangerous situations.

SUMMARY

It is thus an object of the present invention to provide a method and a driver assistance system capable of providing information to the driver or activation of car controls only when considered necessary by the driver and maximizing usefulness of the information for minimizing his disturbance.

The problem is solved by the method and the driver assistance system according to the independent claims.

According to the method for controlling the driver assistance system in the first place information on an environment of a host vehicle is obtained. This information can be obtained for example by a car-to-x communication system or be the output of sensors that are mounted on the host vehicle on which the driver assistance system is mounted. A plurality of sensors can be used in order to realize the capability of a 360° surveillance of the vehicle. Even a mixture of sensors of different types can be used, for example a radar system for object detection and an image processing system including a camera for analysis of traffic signs, traffic lights, lane markings and so on. An evaluation of a traffic scene will be performed on the basis of the provided information. Already known systems are capable of using information provided from a plurality of sources.

According to the inventive method and system an instruction from a host vehicle driver is received by the system preferably a spoken instruction. On the basis of this spoken instruction an evaluation task is generated that defines an aspect of the current traffic scene to be evaluated for example by defining parameters of environment perception and/or evaluation. Contrary to the systems that are known from the state of the art an evaluation of provided information is not performed automatically with respect to predefined preference settings but only upon reception of a driver's instruction. The evaluation task that is generated from such received instruction defines the manner of evaluation and/or perception area and thus tailors the assistance level of the driver assistance system. The evaluation that is carried out by the system is then performed in accordance with the evaluation task and using the obtained information. Finally, information based on the result of the evaluation is output.

According to the present invention, the evaluation of information on the environment of the vehicle that was obtained is performed only according to the evaluation task being a definition of a requested assistance of the driver. The generation and output of information in response to the driver's request or instruction takes even more aspects into consideration. This means that the advanced driver assistance system also evaluates an observed traffic scene with respect to other aspects of the traffic scene. As an example it could be given that if it is only requested by the driver to be informed on traffic approaching from the right side so that the driver can safely perform a turning maneuver to the left at an intersection, the system nevertheless will evaluate the left side of the current road of the ego-vehicle (other aspect) in order to determine if a gap in the traffic approaching from the right may safely be used by the ego-vehicle or if approaching traffic from the left forbids such maneuver. Thus, the evaluation result is not simply output, but starting from such evaluation result, which only provides information about a suitable gap in the traffic approaching from the right, the system evaluates if outputting such information in fact needs adaptation. Thus, the information as finally output to the driver is generated and output not only on the basis of the evaluation result itself, but also on the basis of other aspects of the same. Such other determined aspects can be any aspect that is considered as being related or influencing a judgement that might be made on the basis of the evaluation result only. This means, the evaluation result, in the given example, the gap that is suitable for performing the turning maneuver was correctly determined. But nevertheless, the use of this gap has to further take into consideration other aspects of the entire scene. One such other aspect is for example a car approaching from the left side at such intersection. Other aspects can be taken into consideration as well. It is to be noted that the term "other aspects" might relate as well to an observation sector as to an evaluation of traffic participants or situations not directly needed for generating the evaluation result. An example for the latter are traffic approaching from another area of the environment not defined by the driver's instruction.

The invention is also related to the driver assistance system being adapted to perform the method and a vehicle with such driver assistance system being mounted thereon.

The clear advantage of the present invention is that the response is in fact tailored to the needs of the driver. Even in case that clear information could be given including the information requested, fully answering the request of the driver formulated in the given instruction, the system does not annoy the driver by giving unwanted information, but adapts the generation and/or of the information given in response to the request to information that the system additionally may evaluate. Thus, without giving separate, individual information on different aspects of a common traffic scene the system is able to provide the driver with even more information and thus improves assisting a driver in performing his driving.

In the dependent claims advantageous aspects of the inventive method, system and vehicle are described.

In particular it is advantageous if the time of outputting the information is set on the basis of the existence of a determined other aspect. Coming back to the example with an instruction to observe the right side of the vehicle and thus requesting the system to give information to the driver regarding a gap in traffic approaching from the right, such other aspect could be a vehicle approaching from the left side. In case of a gap that is determined to be suitable in the traffic approaching from the right it could thus be awaited until the vehicle approaching from the left side has passed and only after that the information on the gap is presented to the driver in response to his instruction. Thus, the information with respect to its content may be unchanged but the timing of outputting the information makes use of another aspect of the traffic scene. This results in the driver not being confronted with more information but the information itself is given at a point in time where it is actually useful for the driver.

The method is in particular advantageous if the other aspect of the traffic scene that is defined in the instruction from the driver covers only a portion of an entire area of the environment for which information is obtained. Thus, the driver can request the information to give him information only with respect to a particular sector of the environment to be observed. One basis for outputting the information in response to such instruction is the evaluation result generated in response to the evaluation task generated from the instruction the output information is limited to an aspect that was intended by the driver. Nevertheless other environment sectors that are observed by the advanced driver assistance system are taken into consideration when the content of the information given to the driver or its timing is output. Thus, the information is better suited to assist a driver in fully understanding a traffic scene.

According to another aspect of the present invention the "other aspect" of the traffic scene includes determination of obstacles that are determined to be in an intended trajectory of the vehicle. In particular pedestrians crossing a street could be such obstacles. If the driver in fact focusses on the information that is presented and provided by the system he might not be aware of a pedestrian, a bicyclist or any other traffic participant that is about to be on his intended trajectory.

According to a further advantageous aspect of the invention the driver's awareness for such other aspects that are determined by this system is taken also in consideration. Thus, the system evaluates if the driver has already recognized that there is for example traffic approaching from the left, a pedestrian crossing the street or the like. In case the awareness of the driver that is determined by the system reveals that the driver has already recognized that there are other problems present in a traffic scene, the evaluation of the traffic scene with respect to the instruction of the driver might immediately and without alteration be given. Thus, the driver immediately has at hand all the information needed for correct assessment of the entire traffic scene and can act appropriately.

Further, the other aspects that are the basis for the generation and output of information on the evaluation result in an adapted manner are taken only in consideration if the driver's awareness for such other aspects is determined to be below a predetermined threshold.

It is in particular advantageous if the instruction given by the driver defines an aspect to be evaluated to determine availability of a gap between other traffic participants that can be used for proceeding with the vehicle's intended trajectory. Further it is then advantageous if the evaluation includes a judgement if a gap's size is larger than a minimum necessary gap size. In particular the minimum gap size can be individually set for different drivers and thus the output information can be tailored to individual driving of different drivers. According to a further aspect the minimum gap size can be set in response to a driver's feedback and in particular to an individual driver's behavior and a group of drivers also. Thus, even in case that for one particular driver it is not possible to learn from his behavior what gap size is needed for him to enable safe driving the basis could be an average evaluated from behavior of a plurality of different drivers. On the other side it is advantageous that an adaptation to individual needs can be performed in response to a feedback from the driver. In particular it is advantageous to perform such adaptation in increments.

According to another advantageous aspect not all driver behavior that for example would lead to the conclusion that the suggested gap is not used by the driver are taken into consideration to enlarge the minimum gap size. Thus, before the minimum gap size is set to a larger gap size by the system it is evaluated if the traffic scene gave a reason why the driver did not use a suggested or recommended gap. For example the driver might have observed that another car is approaching from the left side while the gap was announced to be sufficiently large from the right side. In that case the driver decides not to use the gap but there is a reason and thus the system concludes that it was not generally the gap's size that prevented the driver form performing his turning maneuver. Thus, with this aspect of the invention it is avoided that an adaptation of the gap size is performed on the basis of irrelevant driver behavior. Further, it is advantageous if the information content is adapted to a determined driver's awareness on the aspect defined in the instruction. Thus, if the driver already recognized a gap by himself or at least his eye direction and his gaze allow determination that he recognizes the traffic approaching from the right by himself the information given as a response may be shorter than in case the driver did not at all pay attention to the traffic approaching from the right. For example if the driver is aware of traffic approaching from the right it might be sufficient to give him information on a particular car after which the gap size is considered to be large enough.

BRIEF DESCRIPTION OF THE DRAWINGS

The invention will now be described in more detail which respect to the annexed drawings in which.

DETAILED DESCRIPTION

Figure 1:
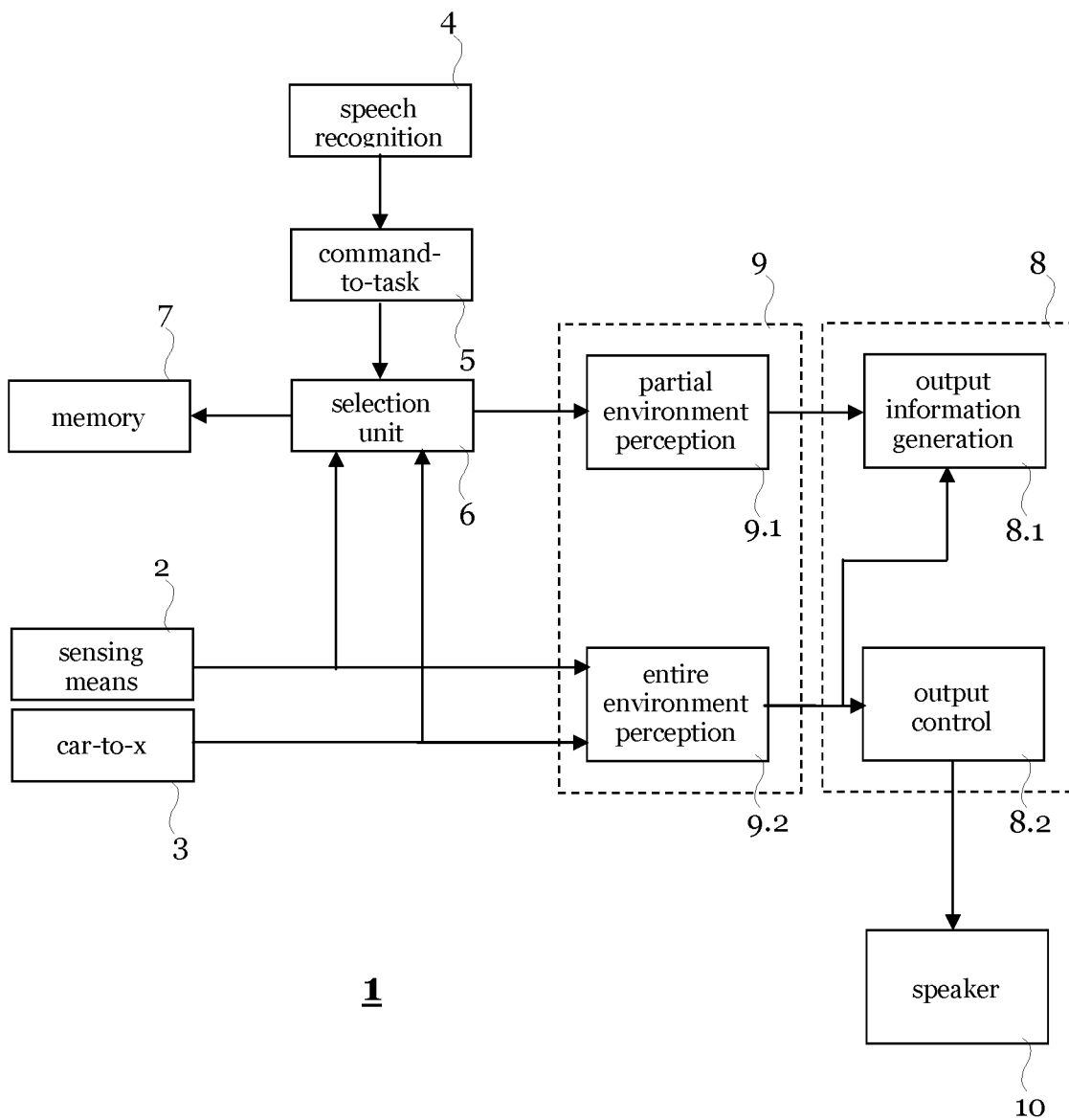
FIG. 1 shows a schematic of the layout of the entire system including the individual units that cooperate for performing the inventive method.

The system and method according to the invention will now be explained in its general steps and elements with respect to FIG. 1. In FIG. 1 there is shown a sensing means 2 that consists of at least one sensor that is provided in the host vehicle. The sensing means 2 can of course comprise a plurality of sensors, even of different types that all together are capable of sensing physically the environment of the vehicle. Examples for such types of sensors can be cameras, radar sensors, laser range finders, ultrasonic sensors or time-of-flight sensors. The range of the environment which is sensed by sensing means 2 is in most cases much larger that what the host vehicle driver can attend. For example, the range that is attendable by the host vehicle driver is limited to his visual field and thus, opposite directions can be viewed by the host vehicle driver only after turning his head. Contrary, a plurality of sensors in the sensing means 2 can be active at the same time and thus, provide information on the environment on the host vehicle for any direction and any area of the environment. Such information on the environment in particular comprises information on position, heading and speed of other traffic participants such as vehicles and pedestrians.

Additionally the host vehicle on which the entire system 1 shown in FIG. 1 is mounted might be equipped with other information sources 3, for example, a car-to-x communication module which is a communication system that receives information on the current traffic scene from other cars or any objects that communicate with the car to transmit information about its current and future status. If information is obtained from another car which is a traffic participant, the car may for example transmit information regarding its own position and/or trajectory and/or speed. Having such an information source included in the entire system is particularly advantageous since it delivers information the sensing means 2 cannot deliver.

The inventive system 1 furthermore comprises a speech recognition unit 4 that receives driver's instruction, preferably the spoken instruction from the host vehicle driver and can interpret the spoken instructions. In the following only spoken instructions will be mentioned, because this is the preferred way for the driver to input his instructions to the system 1. From the spoken instruction a system task is generated. The system task includes a definition what aspect out of a plurality of aspects of an entire traffic scene shall be assessed by the system 1. Instructions may be simple phrases like "watch to the right", "watch the rear", "watch oncoming traffic", "watch the car in front", and so on. These phrases describe the evaluation task that corresponds for example to a request of the driver to the system to observe a particular area of the vehicle's environment or evaluate some parts of a traffic situation. Of course such spoken instructions need interpretation in order to filter the core request of the host vehicle driver. The spoken instructions that are to be used in such a system 1 may be restricted to a limited number of different precisely defined phrases in order to provide for a sufficiently robust recognition. But it is not necessary to limit it to precisely defined commands as modern speech recognition systems are capable of interpreting even more complex expressions it is also possible to use instructions like "tell me at the next crossing if there are vehicles approaching from the right" or "always inform me if there is a bicycle on my right side when I want to turn right".

From these spoken instructions, a system task is generated which means that the result of the interpretation is converted into clear system interval commands that set up the advanced driver assistance system for processing the information on the environment obtained by environment sensing 2 and/or car-to-X-communication 3 to fulfill the system task and thus evaluate an aspect of a traffic scene out of a plurality of aspects constituting this traffic scene. As an easy example the spoken instructions could be checked for presence of key words "watch" and "right". Such an identification could then be used in a mapping unit to generate the system task which defines an area ("right"), relative to the driving direction of the vehicle that shall be subject to the monitoring and evaluation ("watch").

After the system task is being defined the system task is provided from the speech recognition unit 4 to a settings controller 5. In the settings controller 5 the evaluation task is mapped on settings in the driver assistance system that are used to perform the system task. If for example only a particular area of the entire environment of the host vehicle is to be monitored this means that only information out of the entirety of obtained information regarding this particular area of the environment is used. The mapping of the system task to the settings of the system 1 can be used to limit information to only a corresponding part of the information that is provided by the sensing means 2 and/or the car-to-x communication unit or that only objects that are mentioned in the instructions which are perceived are subject to further evaluation. The result of these settings is then supplied to an attention selection section 6 which finally selects the information sources (sensor means, car2x communication system, . . . ) on the basis of the settings given by the settings controller 5.

The previous description was based on the fact that in a current situation a spoken instruction is received from a host vehicle driver and that the evaluation task is generated on the basis of this actual spoken instruction. During use of the inventive system 1 the evaluation tasks that can be generated from the spoken instructions are stored. The evaluation tasks are always stored associated with the traffic scene context. Thus, since the driver assistance system 1 can permanently monitor the environment and thus remember similar traffic scenarios in a current scenario the system can autonomously generate a system task that is likely to be reasonable again. The system task or the corresponding settings may then be retrieved from memory 7 and directly supplied to the selection unit 6. Alternatively only the evaluation task is retrieved from the memory 7 and supplied to the settings controller 5 that generates then the settings and feeds the same to the selection unit 6.

The system further includes an information output unit 8 for outputting a signal including information based on the evaluation results on the requested aspect by the driver. On the basis of the signal a speech output is generated by speaker 10.

The idea of the invention is to optimize a response given to a driver instruction so that with minimum distraction a maximum of information can be provided to the driver. The maximization of the information is not performed by outputting additional and individual information, but by customizing the content and the timing of information in response to the driver's request. To achieve this, the environment perception unit 9 comprises two sections. Of course, the two sections can be implemented as software modules executed on a common processing unit. At first, in a partial environment perception unit 9.1 only information on the environment that is directly related to the instruction given by the driver is evaluated. The partial environment perception unit 9.1 is thus provided with information on the environment sufficient to respond to the driver's request. This is achieved by means of the selection unit 6. The selection unit 6 either literally selects portions of the available information and provides it to the partial environment perception unit 9.1. Alternatively, all the information that is obtained by the system 1 is provided to the environment perception unit 9 in general, but by means of the selection unit 6 it is indicated which of the information needs to be processed by the partial environment perception unit 9.1.

In addition, the environment perception unit 9 comprises an entire environment perception unit 9.2. In the entire environment perception unit 9.2 it is possible to evaluate additionally information on the environment that was not used in the partial environment perception unit 9.1. Advantageously, the entire environment perception unit 9.2 receives information about the results of the partial environment perception unit 9.1. Thus, still referring to the example of requesting the system to give information about traffic approaching from a right side at an intersection, the entire environment perception unit 9.2 receives information from the partial environment perception unit 9.1 that a gap will be available which is suitable to be used by the driver. On the basis of this information then the entire environment perception unit 9.2 evaluates obtained information from sensing means 2 and car-to-X-communication 3 in order to determine if there are any other aspects that can be perceived in the traffic scene from the environment information which might prohibit the use of the identified gap. Such information is for example that another traffic participant is identified by evaluating also the left side of the vehicle approaching from the left. This information on an other aspect is then transferred to the information output unit 8. Of course, also the evaluation result provided by the partial environment perception unit 9.1 is provided to the speech output unit 8.

In the speech output unit 8 both, the evaluation result and the evaluation of other aspects of the traffic scene are combined. This means that the content of the information which is to be output might be adapted to the additionally available information which is per se not output to the driver. In addition or instead of adapting the content to the additional evaluation result, the timing of outputting the information can be controlled by output control unit 8.2. Finally, information is output by means of a speaker 10. Of course, outputting information by a speaker 10 is only one example. Others might be use of head-up display (HUD) or a display on the dashboard or the like.

In the following and with respect to the further FIG. 2, examples will be used to illustrate the inventive method, system and vehicle. When studying the example, it is to be noted that the examples given all use a right-hand-side driving traffic system for illustration reasons only. Of course the invention is not limited to such a system and might easily be adapted to a left-hand driving traffic system.

Figure 2:
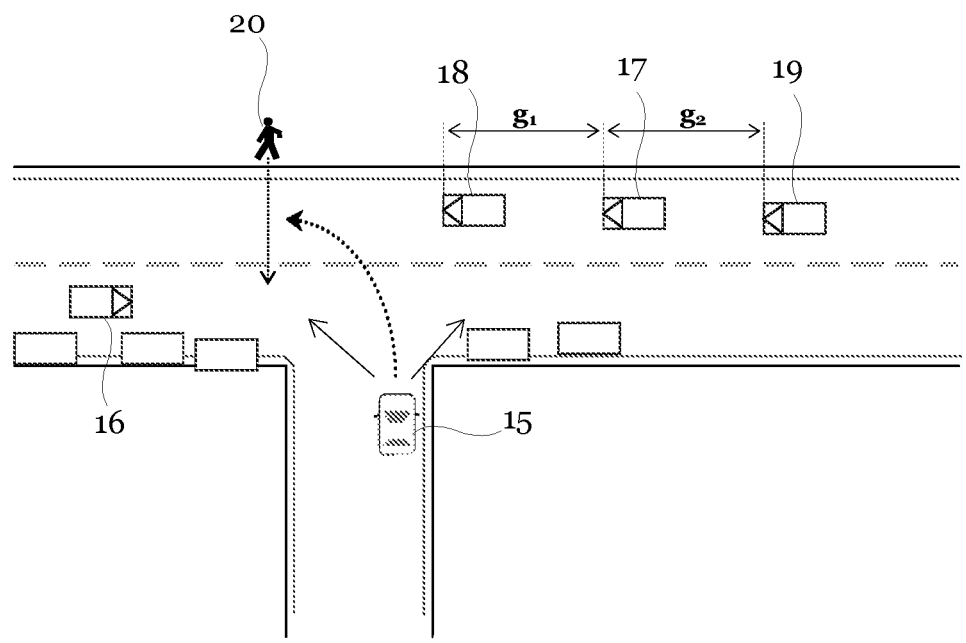
FIG. 2 shows an example for a traffic situation explaining the functioning of the inventive method.

An example for illustrating the operation of the inventive system and method is shown in FIG. 2. The driver of the ego-vehicle 15 is standing at an intersection where he does not have the right of way. The intended trajectory of the vehicle 15 is a left turn. The driver of the vehicle 15 instructs the advanced driver assistance system mounted in the vehicle 15 to observe a right-hand-side of the car in front of the car for example by saying "Watch right". Thus, the task of observing a particular section of the vehicle's environment and evaluating relevant information obtained for this section with respect to an intended driving behavior is delegated to the system 1. From the instruction given by the driver in the example, the system 1 concludes that the evaluation task that has to be performed by the system is determining fitting gaps in traffic approaching from the right side of the road which is intended to be entered by vehicle 15. Thus, the system 1 searches for and determines fitting gaps on the right side. In the illustrated embodiment, the system 1 will detect a first gap $g_1$ between vehicle 17 and preceding vehicle 18. The gap $g_1$ is determined as being larger than a minimum gap size. $G_2$ which is determined between vehicle 17 and vehicle 19 being the successor of vehicle 17 is also larger and would fulfill the requirement with respect to a minimum gap size. Thus two gaps $g_1$ and $g_2$ are available for the turning maneuver and their existence constitutes the evaluation result.

The minimum gap size can be fixedly set when designing the system 1, but advantageously may be adapted during use of the system 1 or when initializing the system 1. The minimum gap size may be set individually for each driver of a car. The gap size might also be set using knowledge from a large pool of drivers. In order to calculate such minimum gap size, the behavior of a plurality of drivers is analyzed. From the knowledge about the size of gaps which are used by the drivers, the minimum gap size sufficient for being used can be calculated. This can of course also be done for each driver individually. In that case it is necessary that the driver performed a sufficient number of comparable maneuvers already meaning entering or not entering into a gap between two vehicles so that a conclusion can be drawn which gap size the respective driver considers as being sufficiently large. This gap size is then defined as minimum gap size.

The behavior of the driver thus can be used to determine a minimum gap size, but it is also possible that a direct interaction between the driver and the system influences the minimum gap size used for evaluation of the traffic scene. For example the driver can give feedback that the suggested gap was too short or that the gap was longer than actually needed or confirm the suggestion of the system by for example saying "this gap was just right". Also feedback commands like "I need larger gaps" or "I don't need such large gaps" can be used. In general, the interpretation of such spoken commands is known in the art. With respect to the present invention, it is only relevant that the content analyzed from such spoken commands leads to an adaptation of the minimum gap size used for the evaluation in the partial evaluation unit 9.1.

As mentioned above, if, based on the minimum gap size actually set, the system recognizes that gaps $g_1$ and $g_2$ are large enough, the system will then monitor automatically also other aspects of the current traffic scene. In the illustrated embodiment, there is a vehicle 16 approaching from the left side. Thus, if the system 1 directly recommended starting the left turning maneuver after vehicle for example by outputting a spoken information "Gap after the second vehicle from the right" based on its evaluation of $g_2$ a critical situation could occur.

For example if the driver of the ego-vehicle 15 would rely on such immediately output suggestion made by the system 1 he possibly already starts to enter the intersecting road. According to the present invention the other aspect of the current traffic situation, namely the car approaching from the left, which is not directly involved in the estimation of gaps $g_1$ and $g_2$ in traffic approaching from the right, is also taken into consideration. In the example vehicle 16 blocks $g_1$ and thus only $g_2$ can reasonably be recommended. After such other aspect was determined by the system the output information is adapted to be useful to the driver. In the present case for example the output of the information "gap after next car" is delayed until vehicle 17 passed the intersection area. At that point in time it is considered by the system 1 that also vehicle 16 has already passed the intersection and thus, gap $g_2$ is available for the ego-vehicle 15. Thus, according to one embodiment of the invention only such gaps are announced to the driver and thus form the output information that can really be taken by the ego-vehicle.

In other situations the output of information might also be performed earlier. This might be advantageous for example if vehicle 16 is not too close to the intersection and thus a quick turning maneuver could make use of gap $g_1$. Because of the earlier information output the driver will also start his turning maneuver earlier and thus not lose time.

It is to be noted that during the waiting time the system could fill a silence by outputting "wait . . . " or "UMM" for example so that the vehicle driver knows that the system 1 is active and will output the desired information shortly.

Furthermore and as also indicated in FIG. 2 there is a pedestrian 20 standing on the other side of the road who is ready to cross the road. When stepping on the lane which is to be used by the ego-vehicle 15 the pedestrian blocks the way and the intended trajectory of vehicle 15 might not be used. Thus, in that case the system 1 would also not output the information that there is a gap in order to avoid that the driver starts his turning maneuver.

As mentioned above, the system 1 will evaluate also the reaction to an output information for adapting its future behavior. In case that for example the driver will not use a gap that was announced by the system 1 as being sufficiently large the system 1 will automatically adapt the minimum gap size in order to better fit to the driver's driving behavior.

This of course works also the other way round. If a gap is considered to be not large enough by the system but nevertheless the driver performs his turning maneuver and safely enters the gap the system 1 will adjust the minimum gap size for future evaluations.

The crucial aspects about the invention is that the information that is output in the end directly refers to what was the desired information of the driver by generating an evaluation result limited to an aspect of a traffic scene defined on the basis of the received instructions. Nevertheless the system 1 will automatically observe the environment not only with respect to this particular evaluation task limited to the instructions given by the driver. The response of the system 1 will give information only related to the area or more generally the aspect of a traffic scene as delegated by the driver. But the timing and possibly also the content of information output as the response to the instruction takes the situation of the entire environment into account and thus also evaluates other aspects of the traffic scene.

In order to further improve the system it is possible that the system analyzes the awareness of the driver to the different aspects of the traffic scene. Thus, it can be determined if the awareness of the driver with respect to the other aspects is sufficient to make a consideration on his own. In that case it might be preferable not to adapt the content of the output information but maybe only its timing. In case that the driver is unaware and that his lack of awareness is considered critical by the system 1 even if it does not correspond to the instruction given by the driver a respective warning message might be output.

Of course the driver can also set preferences or give instructions as to automatic conditions when the system 1 shall be active with respect to a particular instruction. For example the driver might instruct the system 1 to always watch the right side at intersections "until we reach X", "in the city", "in the neighborhood Y", "while it is raining" and so on. Furthermore, also the feedback from the system 1 can be tailored according to the driver's needs. When the system 1 detects a suitable gap usually the information is output at a particular point in time which means relative to the passing vehicle after which the gap is available. Drivers may for example prefer to receive the information generally earlier and thus, the timing of the information output can be adjusted upon entering preference by the driver. Also the frequency of providing the driver with updates on the status of the traffic with respect to the delegated evaluation task can be adjusted. Also the degree of detail that is given in the information can be adjusted by the drivers. Spoken commands are for example "tell me possible gaps earlier", "give me less frequent updates on the traffic from the right", or "tell me the color of the car after which there will be a gap".

The more assistance a driver receives by all driver assistant systems the more there is a risk that the driver fully relies on the evaluation of the system 1. But it is still desirable that the system 1 does not take over full responsibility for the observation of a particular side of the car for example but only to give recommendations to the driver. In order to avoid that the driver might develop overconfidence in the system 1 evaluations the system can observe the driver's gaze patterns if he is still observing the environment himself. Based on such observation the system 1 might then adapt a feedback to the driver and for example express more uncertainty in its response. An example is that the information "gap after next car from the right" is changed to "there might be a gap after the next car from the right". This triggers the attention of the driver to evaluate the situation by himself before he can enter the intersecting road.

Finally it is to be noted that the system 1 can be able to support different intended maneuvers of the driver. All the aforementioned examples referred to a left turning maneuver in case of a right hand driving traffic system. Left hand side driving systems are of course also possible. Furthermore apart from turning also going straight over an intersection, leaving or entering a drive way, and other comparable driving maneuvers may benefit from the inventive method and system. Also observation of the status of traffic lights could be a delegated evaluation task. Of course the instructions that have to be given to the system differ in that case. But generally the idea of the invention is to provide the driver with information limited to respond to his original instructions or requests for observation and evaluation by the system. But to take into consideration further aspects of the entire traffic scene the interaction with the evaluation result being taken in account of adapting at least the timing of outputting the information and/or the information content.

The invention claimed is:

1. Method for assisting a driver in performing a driving maneuver with a vehicle at an intersection, the vehicle comprising at least one sensor, a processing unit and an output unit, the method comprising the steps of:
    obtaining information on an environment of the vehicle from the at least one sensor;
    receiving a spoken instruction from the vehicle driver;
    generating, based on the received spoken instruction, an evaluation task defining an aspect of a current traffic situation encountered by the vehicle to be evaluated,
    wherein the evaluation task defines as the aspect to be evaluated determining an availability of a gap between other traffic participants that can be used for performing the driving maneuver at the intersection, and the aspect of a current traffic situation as defined in the instruction covers only information on a first sector in the environment for which information is obtained;
    performing an evaluation of the obtained information according to and limited to the evaluation task, and generating an evaluation result;
    evaluating the obtained information with respect to other aspects of the traffic situation and determining their relation to the aspect defined in the evaluation task,
    wherein the other aspects define an observation sector in the environment of the vehicle different from the first sector or a traffic participant not defined in the received spoken instruction,
    wherein evaluating the obtained information with respect to the observation sector or the traffic participant not defined in the received spoken instruction comprises determining whether the determined gap can be used for performing the driving maneuver; and
    generating and outputting, by the output unit to the driver, output information on the basis of the evaluation result and the determined other aspects,
    wherein the output information includes the determined availability of a gap in response to the received instruction from the driver, and at least a time of outputting the output information depends on the determined other aspects of the traffic situation.

2. Method for assisting a driver in driving a vehicle according to claim 1, wherein
    the time of outputting the output information is set on the basis of existence of the determined other aspects.

3. Method for assisting a driver in driving a vehicle according to claim 1, wherein
    the evaluation includes a judgement if a gap's size $g_1$, $g_2$ is larger than a minimum gap size.

4. Method for assisting a driver in driving a vehicle according to claim 3, wherein the minimum gap size is individually set for different drivers.

5. Method for assisting a driver in driving a vehicle according to claim 1, wherein
a content of the output information is adapted in response to a determined driver's awareness on the aspect defined in the instruction,
wherein the driver's awareness is determined by observing the driver's eye direction and gaze pattern.

6. Method for assisting a driver in driving a vehicle according to claim 5, wherein
the time of outputting output information is adjusted on the basis of a driver input.

7. Method for assisting a driver in driving a vehicle according to claim 1, wherein
a content of the output information depends on the determined other aspects of the traffic situation.

8. Method for assisting a driver in performing a driving maneuver with a vehicle at an intersection, the vehicle comprising at least one sensor, a processing unit and an output unit, the method comprising the steps of:
obtaining information on an environment of the vehicle from the at least one sensor;
receiving a spoken instruction from the vehicle driver;
generating, based on the received spoken instruction, an evaluation task defining an aspect of a current traffic situation encountered by the vehicle to be evaluated,
wherein the evaluation task defines as the aspect to be evaluated determining an availability of a gap between other traffic participants that can be used for performing the driving maneuver at the intersection;
performing an evaluation of the obtained information according to and limited to the evaluation task, and generating an evaluation result,
wherein performing an evaluation of the obtained information comprises determining whether the available gap can be used for performing the driving maneuver, and judging if the size of the gap between other traffic participants is larger than a minimum gap size;
generating and outputting, by the output unit to the driver, output information on the basis of the evaluation result,
wherein the output information includes the availability of the gap between the other traffic participants in response to the received instruction from the driver, and the minimum gap size is set individually for different drivers.

9. Method for assisting a driver in driving a vehicle according to claim 8, wherein
the minimum gap size is adapted to at least one of a driver's feedback input, and a particular driver's behavior, and a group of drivers.

\* \* \* \* \*